(12) United States Patent
Dinshaw et al.

(10) Patent No.: US 12,495,860 B2
(45) Date of Patent: Dec. 16, 2025

(54) ORTHOTIC SOLE AND INSOLE DEVICES, SYSTEMS, METHODS, AND COMPUTER READABLE MEDIA FOR USE WITH HIGH HEEL FOOTWEAR

(71) Applicant: ALIGN ORTHOTICS INC., Mississauga (CA)

(72) Inventors: Teressa Dinshaw, Mississauga (CA); Darius Dinshaw, Mississauga (CA)

( * ) Notice: Subject to any disclaimer, the term of this patent is extended or adjusted under 35 U.S.C. 154(b) by 0 days.

(21) Appl. No.: 18/379,650

(22) Filed: Oct. 12, 2023

(65) Prior Publication Data

US 2024/0032646 A1   Feb. 1, 2024

Related U.S. Application Data

(63) Continuation-in-part of application No. 17/073,266, filed on Oct. 16, 2020, now abandoned.
(Continued)

(51) Int. Cl.

| | |
|---|---|
| *A43B 7/14* | (2022.01) |
| *A43B 7/142* | (2022.01) |
| *A43B 7/1425* | (2022.01) |
| *A43B 7/144* | (2022.01) |
| *A43B 7/145* | (2022.01) |
| *A43B 13/02* | (2022.01) |
| *A43D 29/00* | (2006.01) |
| *B23C 3/00* | (2006.01) |
| *B33Y 50/00* | (2015.01) |
| *B33Y 80/00* | (2015.01) |
| *G06F 30/10* | (2020.01) |

(52) U.S. Cl.
CPC .............. *A43B 13/023* (2013.01); *A43B 7/14* (2013.01); *A43B 7/142* (2013.01); *A43B 7/1425* (2013.01); *A43B 7/144* (2013.01); *A43B 7/145* (2013.01); *A43D 29/00* (2013.01); *B23C 3/00* (2013.01); *B33Y 50/00* (2014.12); *B33Y 80/00* (2014.12); *G06F 30/10* (2020.01)

(58) Field of Classification Search
CPC ........... A43B 7/14; A43B 7/141; A43B 7/142; A43B 7/1435; A43B 7/144; A43B 7/1425; A43B 7/145
USPC .......................................................... 36/44
See application file for complete search history.

(56) References Cited

U.S. PATENT DOCUMENTS

| | | | | |
|---|---|---|---|---|
| 4,631,841 A | * | 12/1986 | Hickey ................ | A43B 7/1415 36/43 |
| 4,756,096 A | * | 7/1988 | Meyer ................... | A43B 17/14 36/43 |

(Continued)

*Primary Examiner* — Marie D Bays
(74) *Attorney, Agent, or Firm* — MBM Intellectual Property Law LLP (57) ABSTRACT

Orthotic sole devices, systems, methods, and computer readable media are for use with footwear. Three-dimensional scans are used to shape the devices to match the user's feet with the footwear. Each of the devices includes a sunken heel portion, a stopper portion, an arch portion, metatarsal pads, a bunion-cut out shape, and a built-in toe crest portion, all to help redistribute the user's weight away from their forefoot. The devices are infused with *eucalyptus* oils and silver ions. The devices are automatically manufactured via computer numerical control ("CNC") software on a computer readable medium. Milling machines and 3D printers can be used in association with the systems, methods, and computer readable media.

5 Claims, 5 Drawing Sheets

Related U.S. Application Data

(60) Provisional application No. 62/915,981, filed on Oct. 16, 2019.

(56) References Cited

U.S. PATENT DOCUMENTS

| | | | |
|---|---|---|---|
| 8,256,142 B2* | 9/2012 | Igdari | A43B 7/1445 36/43 |
| 2009/0193683 A1* | 8/2009 | Igdari | A43B 7/142 36/43 |
| 2010/0050469 A1* | 3/2010 | Chen | A43B 1/0045 156/73.2 |
| 2010/0180467 A1* | 7/2010 | Singleton | A43B 21/00 36/43 |
| 2010/0269371 A1* | 10/2010 | Gray | A43B 7/141 36/43 |
| 2016/0044990 A1* | 2/2016 | Georgeson | A43B 7/1445 36/43 |
| 2016/0095382 A1* | 4/2016 | Takahashi | A43B 17/00 36/43 |
| 2016/0227879 A1* | 8/2016 | Haselaars | A43B 13/37 |
| 2016/0374431 A1* | 12/2016 | Tow | A43D 1/022 36/43 |
| 2017/0251749 A1* | 9/2017 | Hughes | A43B 7/1445 |
| 2017/0360147 A1* | 12/2017 | Zake | A43B 7/141 |
| 2018/0000194 A1* | 1/2018 | Estrada Vigueras | B29D 35/122 |
| 2018/0014603 A1* | 1/2018 | Saint Dunbar | A43B 7/1445 |
| 2018/0168278 A1* | 6/2018 | Saint Dunbar | A43B 7/142 |
| 2018/0343965 A1* | 12/2018 | Mitchell | B32B 7/12 |
| 2018/0352897 A1* | 12/2018 | Tambert | A43B 7/146 |
| 2019/0069628 A1* | 3/2019 | Cutler | A43B 7/1464 |
| 2020/0085142 A1* | 3/2020 | Green | A43B 7/1435 |
| 2020/0121029 A1* | 4/2020 | Hayashi | A43B 7/141 |
| 2020/0315287 A1* | 10/2020 | Benincasa | A43B 7/28 |
| 2021/0112920 A1* | 4/2021 | Dinshaw | B33Y 80/00 |
| 2021/0290424 A1* | 9/2021 | Everson | A43B 7/143 |
| 2021/0298412 A1* | 9/2021 | Takahashi | A43B 7/143 |
| 2022/0053880 A1* | 2/2022 | Taylor | A43B 13/20 |

* cited by examiner

PRIOR ART

ORTHOTIC SOLE AND INSOLE DEVICES, SYSTEMS, METHODS, AND COMPUTER READABLE MEDIA FOR USE WITH HIGH HEEL FOOTWEAR

FIELD OF THE INVENTION

The present invention relates generally to orthotic insoles and footwear and, more particularly, to orthotic sole and insole devices, systems, methods, and computer readable media for use with high heel footwear.

BACKGROUND OF THE INVENTION

It may be desirable to make high heel shoes and other footwear more comfortable, by redistributing weight and/or improving foot posture within the footwear, using an orthotic sole or insole device.

In the prior art, there may have been a number of gimmicks which may have promised but afforded little or no functionality in this respect. Many such gimmicks, including off-the-shelf ones offered at drug stores and elsewhere, may have failed to consider or incorporate a medical assessment component relating, for example, to particular individual users' biomechanics, foot type, unique foot anatomy, and/or medical histories.

Some prior art shoe inserts may have afforded some help but, notwithstanding claims to the contrary, may have failed to effectively help stop the users foot from sliding forward. Such inserts may have been provided with a toe crest that did not work with certain types of shoes, such as those with front straps and those with insufficient room in toe box portions thereof. Such inserts also may have failed to shift the users weight to the back of their heel and away from their forefoot.

Similarly, other prior art insoles may have been formed from a clear resin material. While such insoles were designed in an effort to slow the users foot from falling forward in their shoe, they may have failed to splay the users toes, lift their metatarsal heads, adequately and accurately support their arches (e.g., the medial longitudinal arch, transverse arch, and lateral longitudinal arch), unload high pressure areas of their foot, and/or redistribute the users weight.

These and other inserts and insoles may have also suffered from a further limitation in that their intended design was for permanent placement into the user's shoes, without affording the user with any ability to move them over to their other shoes.

Reinforced heel orthotic inserts may have been known in the prior art. They may have been designed to reduce impact at the heel, referencing the calcaneus or heel bone. In this respect, they may have substantially nothing to do with, and/or may be completely different than, the present invention.

Other high heel shoe devices of limited comfort may have been known in the prior art. While they may have been designed for use as (or with) high heels, they may have failed to afford sufficient comfort and/or a ready ability to conform to the shape of the user's shoe pitch and/or slope line, for example, to accommodate minor nuances. The shape of such devices may not have been designed and/or matched to the user's heel pitch and/or slope line. Heel pitch refers to the angle of the midsole from the heel to the flexpoint of the shoe, typically measured in degrees. Slope line refers to the curvature observed of the midsole from heel to flexpoint of the shoe. They also may have failed to afford sufficient space for the user's first metatarsal joint, which typically may be enlarged; and/or they may have failed to provide a cutout for the user's first metatarsal-phalangeal joint that effectively assists in mechanical loading through the forefoot.

What may be needed are orthotic sole and/or insole devices, systems, methods, and/or computer readable media for use with high heel footwear. (For example, computer readable media may be needed or desired to record—and/or, operatively, to encode one or more computer processors to help implement or perform—one or more features, interworkings, and/or steps that are depicted or discussed herein in the context of the devices, systems, and/or methods according to the invention.)

It may be desirable and/or beneficial to provide an orthotic sole and/or insole device, system, method, and/or computer readable medium for use with high heel footwear.

It may be an object according to one aspect of the invention to provide an orthotic sole and/or insole device, system, method, and/or computer readable medium for use with high heel footwear.

It is an object of the present invention to obviate or mitigate one or more disadvantages and/or shortcomings associated with the prior art, to meet or provide for one or more desires, benefits, needs and/or advantages, and/or to achieve one or more objects of the invention-one or more of which may preferably be readily appreciable by and/or suggested to those skilled in the art in view of the teachings and/or disclosures hereof.

SUMMARY OF THE INVENTION

An object of the present invention is to provide orthotic sole and insole devices, systems, methods, and computer readable media for use with high heel footwear. In accordance with an aspect of the present invention, there is provided method for manufacturing a custom orthotic sole device for a user, customized a foot of the user and a footwear of the user, the method comprising steps of: (a) performing a three-dimensional ("3D") foot scan of characteristic anatomical features of the foot of the user; (b) performing a 3D footwear scan of the footwear, wherein the 3D footwear scan comprises a slope line and a pitch of the footwear of the user; and (c) shaping the custom orthotic sole device, in dependent relation based on the 3D foot scan and the 3D footwear scan, to correspond to the characteristic anatomical features of the foot of the user with the slope line and the pitch of the footwear of the user; wherein the custom orthotic sole device is further shaped to define one or more of the following orthotic sole features: a sunken heel cup portion, wherein the sunken heel cup portion is configured to help counter-shift a weight of the user backwards and to help realign a heel of the user; a heel stopper portion adjacent to and forward of the sunken heel cup portion, wherein the heel stopper portion is configured to engage and support a calcaneus of the user and to help stop the calcaneus from sliding downward in the footwear; an arch portion, wherein the arch portion is raised to a predetermined degree to help stabilize a posture of the foot of the user in the footwear of the user and to help reinforce and stop the foot of the user from sliding downward in the footwear of the user; metatarsal head pad portion, wherein the metatarsal head pad portion is shaped to a predetermined height and have a predetermined durometer and hardness value, to help support the weight of the user, to help with a predetermined shift of metatarsal heads of the foot of the user, and to help with a predetermined splay of toes of the foot of the user; a bunion cut out shape, wherein the bunion cut out shape is configured to help to offload a bunion area of the foot of the user, and to help reduce pressure on a forefoot of the foot of the user; and a built-in toe crest portion, wherein the toe crest portion is configured to help space and divide the toes of the foot of the user, to help keep the toes inside the footwear, and to help prevent the toes from becoming squished, overlapping, or falling out from the footwear; wherein the custom orthotic sole device is adapted to help provide for redistribution of the weight of the user away from the forefoot of the user by combination of at least two of said orthotic sole features; wherein step (c) is performed in dependent relation based on at least one of the following medical assessment components: a total body alignment of the user; a posture of the user; a gait of the user; a leg length discrepancy of the user; and a limited range of motion of the user; any pelvic tilt of the user; and a substantially precise measured degree of any misalignment of the user; wherein, in step (c), the custom orthotic sole device is automatically 3D printed or milled via computer numerical control ("CNC") software on a computer readable medium operatively connected to a 3D printer or a milling machine; wherein the method and the custom orthotic sole device are adapted for use with, and to fit, a wide range of feet and footwear; wherein the method and the custom orthotic sole device are adapted to help avoid toe crush and toe spilling of the toes of the user at a toe box area of the footwear; and wherein the custom orthotic sole device is infused with a blend of *eucalyptus* oils and/or silver ions, to lend substantial antifungal, antibacterial, and/or moisture wicking characteristics.

In accordance with another aspect of the present invention, there is provided method for manufacturing a custom orthotic sole device for a user, customized to a foot of the user and a footwear of the user, the method comprising steps of (a) performing a three-dimensional ("3D") foot scan of characteristic anatomical features of the foot of the user; and (b) shaping the custom orthotic sole device, in dependent relation based on the three-dimensional ("3D") foot scan, to correspond to the characteristic anatomical features of the user's feet; and wherein the custom orthotic sole device is further shaped to define one or more orthotic sole features.

In accordance with another aspect of the present invention, there is provided custom orthotic sole device customized to a foot of a user and a footwear of the user, wherein the custom orthotic sole device is manufactured using a three-dimensional ("3D") foot scan of characteristic anatomical features of the user's feet; wherein the device is shaped, in dependent relation based on the three-dimensional ("3D") foot scan, to correspond to the characteristic anatomical features of the user's feet; and wherein the custom orthotic sole device is further shaped to define one or more orthotic sole features.

BRIEF DESCRIPTION OF THE DRAWINGS

The novel features which are believed to be characteristic of the present invention, and related devices, systems, methods, and/or computer readable media according to the present invention, as to their structure, organization, use, and/or methods of manufacture and/or operation, together with further objectives and advantages thereof, may be better understood from the figures which accompany this application, in which presently preferred embodiments of the invention have been illustrated by way of example. It is expressly understood, however, that such figures have been provided for the purpose of illustration and/or description only, and not intended as a definition of the limits of the invention. In the accompanying figures.

DETAILED DESCRIPTION OF THE INVENTION

According to the invention, there are disclosed orthotic sole and/or insole devices, systems, methods, and/or computer readable media, designed by a certified pedorthist (or other footcare specialist trained in biomechanics, orthotic design, and orthotic manufacturing), for use with high heel footwear. One or more of the following medical assessments may be employed in carrying out the methods of the present invention: (a) assessment of the user's total body alignment (posture and gait analysis); (b) assessment of whether the user may have a leg length discrepancy; (c) assessment of whether the user may have a limited range of motion; (d) assessment of whether the user may have a pelvic tilt; (e) assessment of whether the user may have some other reason not to change the body's natural position into a high heel at all; and/or (f) assessment of a degree to which the user may be misaligned.

According to one embodiment of the invention, the methods for manufacturing a custom orthotic sole device include and/or provide for one or more three-dimensional ("3D") scans of the user's feet and/or of the high heels to be fitted, preferably to match the characteristic anatomy of such user feet to the slope line and pitch of their footwear for which the heel orthotic is being designed.

Accordingly, one object of the present invention is to provide a method for manufacturing a custom orthotic sole device for a user, customized to the users feet and/or footwear, including a step of performing a three-dimensional ("3D") foot scan of characteristic anatomical features of the user's feet. The method may also preferably include a step of performing a 3D footwear scan of the footwear of the user. The 3D footwear scan may preferably include a slope line and/or pitch of the footwear. The method may preferably include a step of shaping the custom orthotic sole device, preferably in dependent relation based on the three-dimensional ("3D") foot scan and/or the 3D footwear scan, and/or preferably to correspond to the characteristic anatomical features (which may be alternately referred to herein as the "unique anatomy" or "characteristic anatomy") of the user's feet with the slope line and/or pitch of the footwear.

According to the present invention, there is also disclosed a method for manufacturing a custom orthotic sole device for a user, customized to the user's feet and footwear. The method may preferably include step (a) of performing a three-dimensional ("3D") foot scan of characteristic anatomical features of the user's feet, and may preferably include a step of shaping the custom orthotic sole device, preferably in dependent relation based on the three-dimensional ("3D") foot scan, and to correspond to the characteristic anatomical features of the user's feet. The custom orthotic sole device may preferably be further shaped to define one or more orthotic sole features.

According to one aspect of the invention, the method may preferably, but need not necessarily, also include a step of performing a 3D footwear scan of the footwear. The 3D footwear scan may preferably, but need not necessarily, include a slope line and/or pitch of the footwear. Preferably, in the step of shaping the custom orthotic sole device, the custom orthotic sole device may preferably, but need not necessarily, also be shaped in dependent relation based on the 3D footwear scan. The characteristic anatomical features of the user's feet may preferably, but need not necessarily, be matched with the slope line and/or pitch of the footwear.

The "pitch" is defined as the angle between the heel and the forefoot or flex point of the shoe. Typically, the heel point is selected in the middle of the midsole at the highest point, and the flex point of the shoe is selected at the middle of the lowest point of the shoe. The angle is measured in reference to the ground which would be considered 0 degrees. The "slope line" of the shoe is captured using a 3D laser scan from the most posterior aspect of the heel at the highest height (in terms of elevation) of the midsole to the lowest (in terms of elevation) flex point of the midsole of the shoe. The plantar aspect of the orthotic device is matched to the exact slope line of the shoe using CADCAM software.

The custom orthotic sole device may preferably be shaped to define one or more of the following orthotic sole features: (i) a sunken heel cup portion, preferably to help counter-shift a weight of the user backwards and/or to help realign a heel (which may be alternately referred to herein as "to help align a calcaneus") of the user; (ii) a heel stopper portion, substantially adjacent to and/or forward of the heel cup portion, preferably to engage and/or support a calcaneus of the user and/or to help stop the calcaneus from sliding downward in the footwear; (iii) an arch portion, which may preferably be raised to a predetermined degree, preferably to help stabilize a posture of the user's feet in the footwear and/or to help reinforce and/or stop the user's foot from sliding downward in the footwear; (iv) metatarsal head pad portion, which may preferably be shaped to a predetermined height and/or with a predetermined durometer and hardness value, preferably to help support the weight of the user, to help with a predetermined shift of metatarsal heads of the user's feet, and/or to help with a predetermined splay of toes of the user's feet; (v) a bunion cut out shape, preferably to help to offload a bunion area of the user, and/or to help reduce pressure on a forefoot of the user; and/or (vi) a built-in toe crest portion, preferably to help space and/or divide the toes of the user, to help keep the toes inside the footwear, and/or to help prevent the toes from becoming squished, overlapping, and/or falling out from the footwear.

The method and the custom orthotic sole device may preferably be adapted to help provide for redistribution of the weight of the user away from the forefoot of the user by combination of the aforesaid orthotic sole features. The method and the custom orthotic sole device may also be adapted to help avoid toe crush and/or toe spilling of the toes of the user at a toe box area of the footwear.

According to an embodiment of the invention, the step of shaping the custom orthotic sole device may preferably be performed in dependent relation based on one or more of the following medical assessment components: a total body alignment of the user; a posture of the user; a gait of the user; a leg length discrepancy of the user; a limited range of motion of the user; a pelvic tilt of the user; and a substantially precise measured degree of any misalignment of the user.

In the step of shaping the custom orthotic sole device, the custom orthotic sole device may preferably be automatically 3D printed and/or milled via computer numerical control ("CNC") software on a computer readable medium operatively connected to a 3D printer and/or a milling machine. The method and/or the custom orthotic sole device may preferably be adapted for use with, and/or to fit, a wide range of feet and/or footwear.

In one embodiment, the custom orthotic sole device further comprises a top cover, and the method further comprises a step of infusing the top cover of the custom orthotic sole device with a blend of *eucalyptus* oils and/or silver ions, to lend substantial antifungal, antibacterial, and/or moisture wicking characteristics.

According to one aspect of the invention, the custom orthotic sole device may preferably, but need not necessarily, be automatically 3D printed via computer numerical control ("CNC") software on a computer readable medium operatively connected to a 3D printer.

According to one aspect of the invention, the custom orthotic sole device may preferably, but need not necessarily, be automatically milled via computer numerical control ("CNC") software on a computer readable medium operatively connected to a milling machine.

According to one aspect of the invention, the custom orthotic sole device may preferably, but need not necessarily, be infused with a blend of *eucalyptus* oils and/or silver ions, preferably to lend substantial antifungal, antibacterial, and/or moisture wicking characteristics.

According to the invention, there is also disclosed a custom orthotic sole device for a user, customized to the user's feet and footwear. The device may preferably be manufactured using a three-dimensional ("3D") foot scan of characteristic anatomical features of the user's feet. The device may preferably be shaped, preferably in dependent relation based on the three-dimensional ("3D") foot scan, and/or preferably to correspond to the characteristic anatomical features of the user's feet. The custom orthotic sole device may preferably be further shaped to define one or more orthotic sole features.

According to one aspect of the invention, the device may preferably, but need not necessarily, also be manufactured using a 3D footwear scan of the footwear that preferably includes a slope line and/or pitch of the footwear. The device may preferably, but need not necessarily, also be shaped: in dependent relation based on the 3D footwear scan; and/or such that the characteristic anatomical features of the users feet may preferably, but need not necessarily, be matched with the slope line and/or pitch of the footwear.

According to one aspect of the invention, the orthotic sole features may preferably, but need not necessarily, include: (i) a sunken heel cup portion (alternately referred to herein as a heel cup portion) preferably to help counter-shift a weight of the user backwards and/or to help realign a heel of the user; (ii) a heel stopper portion, preferably substantially adjacent to and/or after the heel cup portion, and/or preferably to engage and/or support a calcaneus of the user and/or to help stop the calcaneus from sliding downward in the footwear; (iii) an arch portion, which may preferably, but need not necessarily, be raised to a predetermined degree, preferably to help stabilize a posture of the user's feet in the footwear and/or to help reinforce and/or stop the user's foot from sliding downward in the footwear; (iv) metatarsal head pad portion, which may preferably, but need not necessarily, be shaped to a predetermined height and/or with a predetermined durometer and/or hardness, preferably to help support the weight of the user, to help achieve any predetermined shift of metatarsal heads of the user's feet, and/or to help achieve any predetermined splay of toes of the user's feet; (v) a bunion cut out shape, preferably to help offload a bunion area of the user, and/or to help reduce pressure on a forefoot of the user; and/or (vi) a built-in toe crest portion, preferably to help space and/or divide the toes of the user, to help keep the toes inside the footwear, and to/or help prevent the toes from becoming squished, overlapping, and/or falling out from the footwear.

According to the invention, there is also disclosed a computer-readable medium encoded with executable computer processing instructions to, when operatively executed by one or more computer processors, preferably perform any of the methods above, and/or manufacture any of the devices above.

Figure 2:
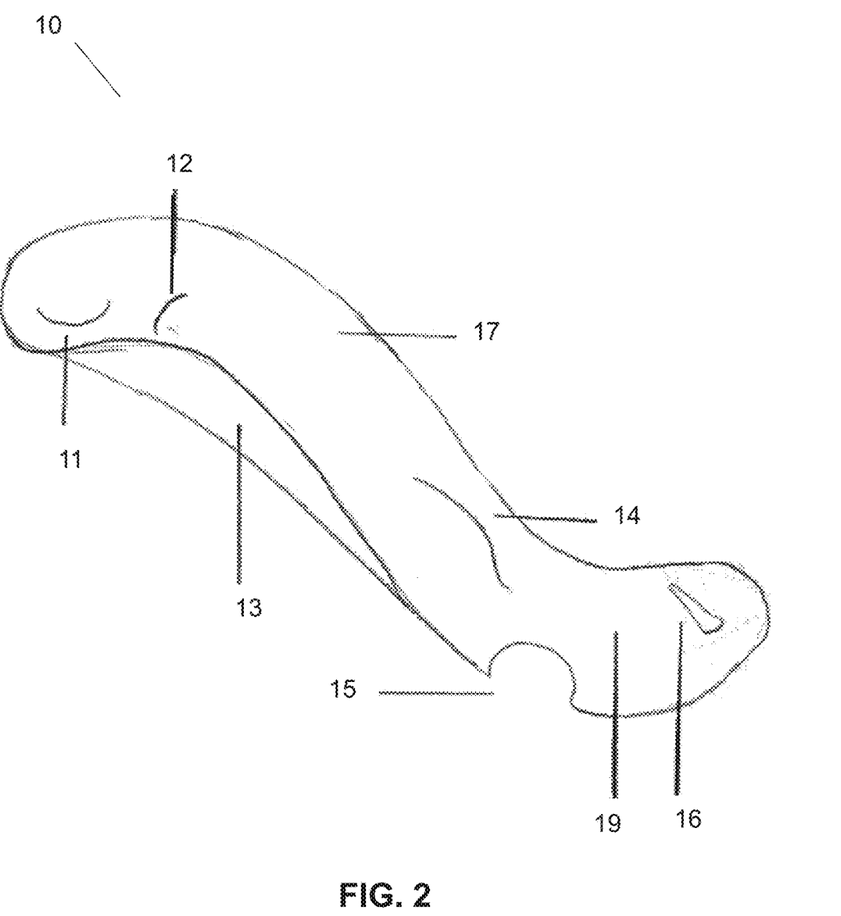
FIG. 2 is a top side perspective view of an orthotic insole device according to one embodiment of the invention.
Figure 3:
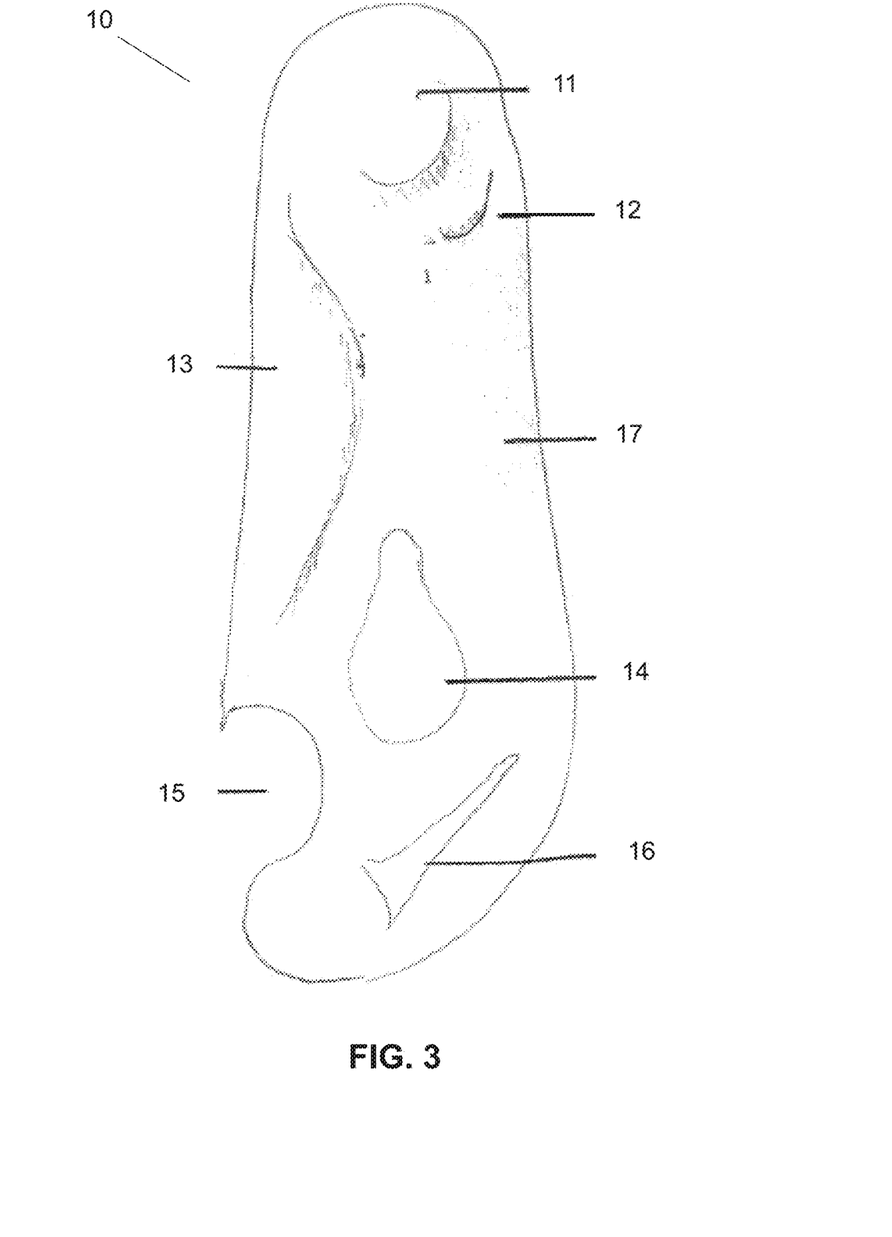
FIG. 3 is a top plan view of the orthotic insole device of FIG. 2.
Figure 4:
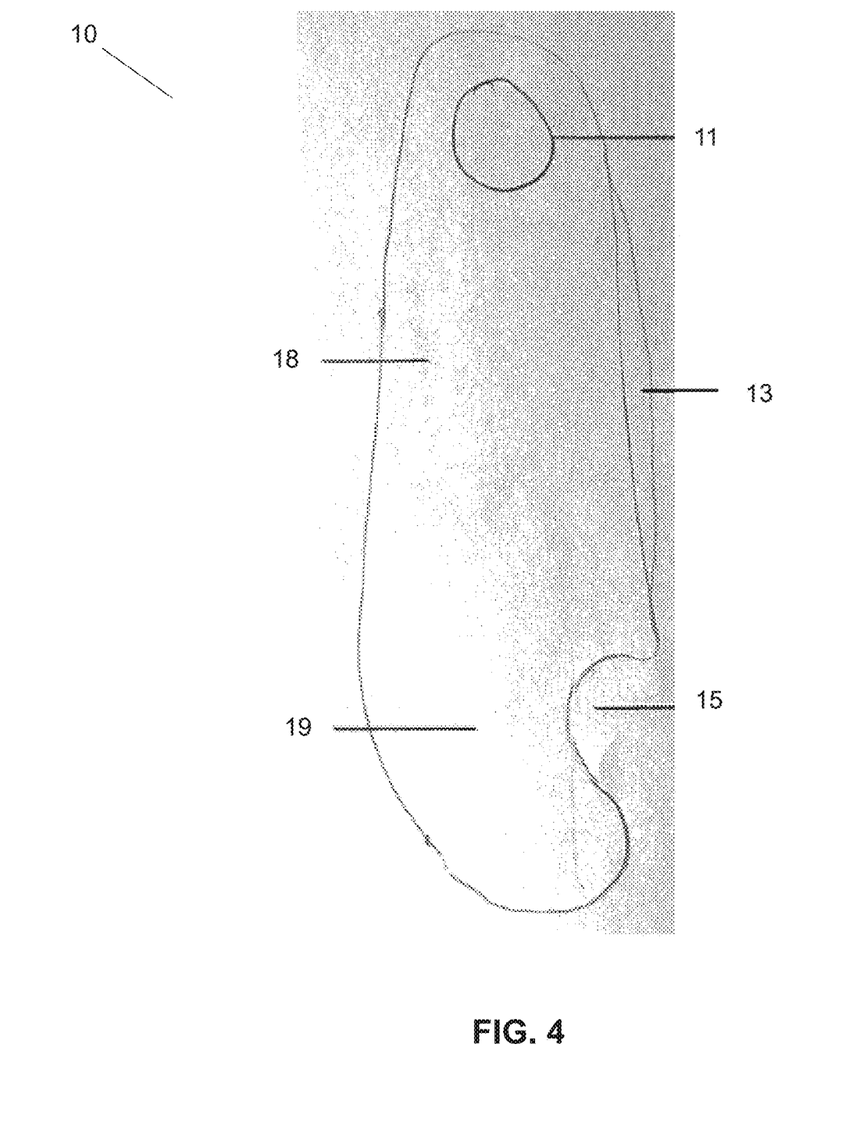
FIG. 4 is a bottom plan view of the orthotic insole device of FIG. 2.

The devices, systems, methods, and/or computer readable media according to the invention may preferably, but need not necessarily, be adapted to include and/or provide for one or more features and/or functionalities as illustrated in accompanying FIGS. 2 to 4.

Persons skilled in the art will appreciate, in view of the teachings and disclosures herein, that the devices, systems, methods, and/or computer readable media according to the invention may offer significant advantageous utilities and/or functionality in comparison to prior art.

Other advantages, features, and/or characteristics of the present invention, as well as methods of operation and functions of the related elements of the structure, operation, and/or the combination of parts, features, and/or economies of manufacture, will become more apparent upon consideration of this detailed description with reference to the figures which accompany this application.

This disclosure, including the accompanying drawings, may include one or more numbers, words, phrases, sentences, arrangements, and/or configurations which may be included by way of example. It may bear repeating, in this respect specifically, that such drawings and/or this disclosure are for the purpose of illustration and description only, and not intended as a definition of the limits of the invention.

The accompanying drawings illustrate aspects of one or more orthotic insole devices according to preferred embodiments of the invention.

Figure 1:
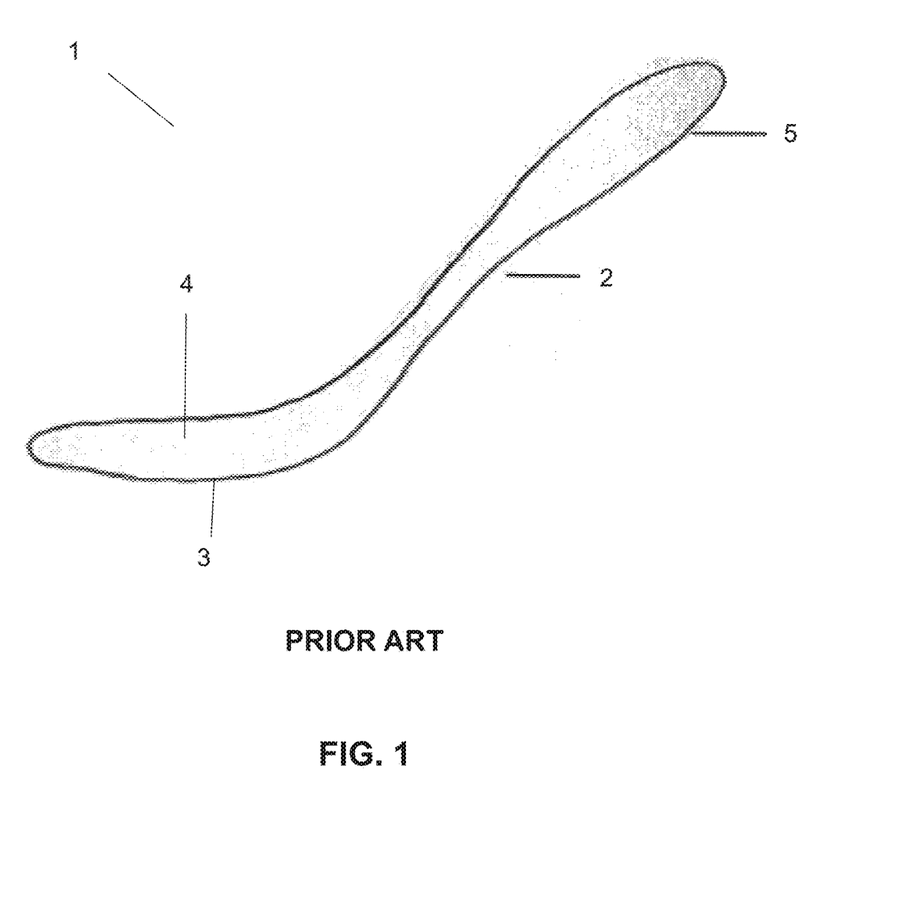
FIG. 1 is a side perspective view of a prior art orthotic insole.

FIG. 1 depicts a prior art orthotic insole 1 with a heel cup 5 for rear foot alignment and posture, an arch support 2 for midfoot correction, a metatarsal support 4 for balance and forefoot alignment, and additional cushioning 3 for improved shock absorption.

FIGS. 2 to 4 depict an orthotic insole device 10 according to one embodiment of the invention. Although the orthotic insole device shown in FIGS. 2 to 4 is for a left foot, it will naturally be understood that the invention also encompasses orthotic insole devices for a right foot, and persons having ordinary skill in the art may readily appreciate that they may be a mirror image of the orthotic insole device shown in FIGS. 2 to 4. FIG. 2 is a top right perspective view, FIG. 3 is a top view, and FIG. 4 is a bottom view of the orthotic insole device according to a preferred embodiment of the invention.

As shown in FIGS. 2 to 4, the orthotic insole device 10 according to this embodiment is preferably shaped with sunken heel cup portion 11, which is a countersink or sunken area on the heel portion of the insole. In one embodiment, the sunken heel cup portion is displaced with a padding material which is preferably formed from a microporous foam material. In one embodiment, the padding material is a high-density polyurethane foam. In one embodiment the padding material is a Poron® material as may be offered by Rogers Corporation of Chandler, Ariz.). In one embodiment, the padding material affords thermal insulation characteristics. The sunken heel cup portion 11 preferably enables a user's heel to sink into a cupped position therein. It preferably helps with rear foot alignment and posture or helps to redistribute the user's weight to a back portion of the heel.

In one embodiment, the orthotic insole device 10 according to the invention is further shaped with a built-in heel stopper portion 12, which helps to prevent the ball of the user's heel from sliding forward. In a preferred embodiment, the orthotic insole device 10 according to the invention is further shaped with a built-up arch portion 13, which preferably helps raise and fully support the arch of the user's foot, preferably by redistributing foot position and body weight, and helps to redistribute the foot's weight and position in the shoe.

In one embodiment, the orthotic insole device 10 according to the invention is further shaped with a built-up metatarsal head pad portion 14, which preferably helps to lift the bones of the user's foot and to splay its toes. It preferably also helps with balance and forefoot alignment.

In one embodiment, the orthotic insole device 10 according to the invention is further shaped with a bunion cut-out portion 15, which preferably helps displace weight distribution of a user's bunion. The bunion cutout portion 15 is preferably for the user's first metatarsal-phalangeal joint and effectively assists in mechanical loading through the forefoot.

In one embodiment, the orthotic insole device 10 according to the invention is further shaped with a toe crest portion 16, which preferably helps to neatly position and space the toes of the user's foot. The toe crest 16 assists with preventing the foot from sliding forward as the toes grip over the toe crest and hold the ball (metatarsal head) of the foot in place.

Also, as shown in FIGS. 2 to 4, the orthotic insole device 10 includes base portion 18. In one embodiment, base portion 18 is formed from a closed cell ethylene-vinyl acetate ("EVA") copolymer foam material, or from a renewable source used in additive manufacturing. In one embodiment, the base portion is shaped with one or more of the following features: a sunken heel cup portion 11, a heel stopper portion 12, an arch portion 13, a metatarsal head pad portion 14, a bunion cut out shape 15, and a toe crest portion 16.

In one embodiment, the EVA base portion 18 is CNC milled (or 3D printed) using digital computer-aided design/computer-aided manufacturing ("CAD/CAM") computer systems, which may preferably be used to design and/or control manufacture processes for the EVA base portion. It is within the scope of the present invention to use manufacturing processes other than CNC milling and/or 3D printing manufacturing processes to prepare the orthotic insole device 10 of the present invention.

In one embodiment, the orthotic insole device 10 according to the invention is further provided with a top-cover portion 17, which is preferably glued to the EVA base portion. In one embodiment, the top-cover portion 17 is infused with one or more *eucalyptus* oils and silver ions to afford antifungal and antibacterial properties, and to help make the top-cover thermoregulated and substantially odour free. The top-cover portion 17 may also provide enhanced grip for a user's barefoot, and further improve the device's ability to prevent the user's foot from sliding forward.

As best seen in FIGS. 2 and 3, in one embodiment, the orthotic insole device 10 is also provided with an additional cushioning portion 19, which preferably affords improved shock absorption.

Figure 5:
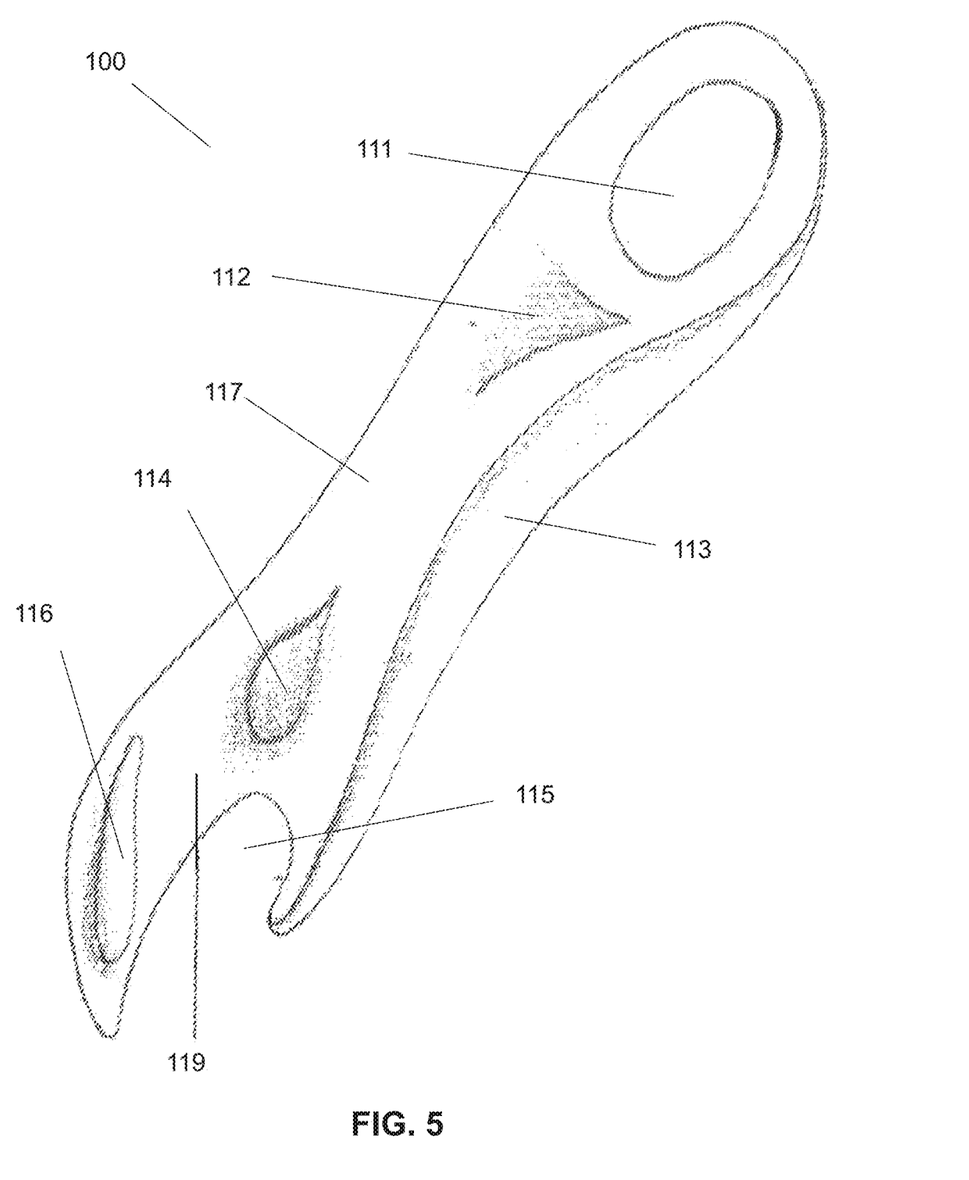
FIG. 5 is a top side perspective view of an orthotic insole device according to a further embodiment of the invention.

FIG. 5 depicts an orthotic insole device 110 according to a further embodiment of the invention. As shown in FIG. 5, orthotic insole device 110 includes sunken heel cup portion

111, built-in heel stopper portion 112, built-up arch portion 113, built-up metatarsal head pad portion 114, bunion cut-out portion 115, and toe crest portion 116. The base portion 118 of orthotic insole device 110 is formed from EVA material which is covered with top cover portion 117, which is preferably glued to the EVA base portion.

According to preferred embodiments of the invention, the devices, systems, methods, and/or computer readable media are adapted for use in combination with assessment of related medical factors and the user's weight and height. The systems, methods, and/or computer readable media according to embodiments of the invention involve and/or provide for precise measurement (e.g., sub-millimeter dimensions and measurements) of the user's feet and high heel footwear which are preferably taken by 3D scan or photogrammetry. The orthotic insoles according to the invention are preferably medically designed to change biomechanical weight distribution and position, and total body alignment.

The orthotic insole device according to the invention is placed inside high heel footwear. In use, the insole, through biomechanical correction of the user's foot placement and positioning within the high heel footwear, preferably helps to eliminate shin splints, achilles tendonitis, heel spurs, hammer toes, and plantar fasciitis, helps to align the bones of the user's foot and the users rear foot, and helps provide foot comfort, shock absorption, improved gait, bunion safety and support, and a corrected and supported arch and mid-foot. Additionally, use of the invention preferably helps provide better posture and total body alignment, and more comfort in the users legs, knees, hips, back, and shoulders.

Substantially precise and/or exact dimensions, measurements, specs, and/or other information—including 3D scans of the user's feet in weight-bearing and/or neutrally corrected (calcaneal vertical, sub-talar neutral, with rearfoot and forefoot neutrally positioned to the users anatomical alignment) non-weight bearing configurations—are preferably transferred digitally for manufacture of the insoles according to the invention. In manufacturing methods, according to the invention, this information is preferably imported to CAD/CAM software on computer readable media to prepare it for output to a CNC milling machine, additive manufacturing/3D printing, and/or other system.

In one embodiment, the insole base portion is milled from an EVA block using a CNC milling machine, or is formed from a renewable source used in additive manufacturing, and/or other system according to the invention. According to one embodiment of the invention, the EVA blocks may have standard dimensions of about 5.5 inches, by about 1.25 inches, by about 13.25 inches. In one embodiment, the EVA blocks have a Shore Type A durometer hardness in the range of between about 30 and about 50.

After milling, the blocks are preferably shaped as insoles and/or hand-finished with a top-cover portion that is preferably applied and secured thereto by a manual gluing process. It is within the scope of the present invention to encompass, instead or in addition, applying the top-cover to the base portion by an automated gluing process.

The top-cover portion for each insole is preferably formed from pre-cut pieces and/or a roll of top-cover material. One or more logos may be pre-printed (e.g., in a zinc-coloured ink) on the top-cover material. The top-cover material preferably has antibacterial properties. In one embodiment, the top-cover material is embedded with silver ions, and is preferably breathable. In one embodiment, the top-cover material has an absorption capacity of preferably about 8 times its weight in water. The top-cover material preferably affords comfort and dryness properties with its thermo-regulating effect as aforesaid, and is substantially abrasion, tear, and/or rip resistant under both dry and humid (or wet) conditions. In one embodiment, the top-cover material is embedded with a natural *Eucalyptus* aroma, and preferably keeps its aroma when washed in temperatures of up to about 30° C. It is preferably anti-allergic and does not generate odors. In one embodiment, the top-cover material has a thickness of about 0.75 millimeters. It is preferably relatively light, flexible, and comfortable (as compared, for example, with pigskin). The top-cover material is grindable and can be readily worked with. In one embodiment, the top-cover material is similar to real leather but with increased strength.

The top cover portion preferably, in addition to helping the foot breathe, provides a high grip surface that may help keep the foot from sliding forward inside the user's high heel footwear.

After manufacture, finished orthotic insole devices according to the invention may preferably be fit on the user's foot and in specific footwear, and minor adjustments may be performed if necessary.

Accordingly, some features, elements, parts and/or steps that preferably work together according to (or in association with) the invention may include a medical assessment of the users needs, 3D scans, correct and/or appropriate footwear, digital design and manufacture of an orthotic insole device, and a professional fitting. Some of the invention's features, elements, parts, steps, and/or sub-combinations thereof may be altogether new, including the built-in heel stopper, the sunken heel cup portion, and one or more combinations of features, including the EVA base portion and the top cover portion, along with a medical assessment, digital design and manufacture, and dispensing.

In use, some advantages of the invention, over the prior art, may include one or more of the following: (a) its utility in obviating or mitigating one or more disadvantages or shortcomings associated with the prior art, in meeting or providing for one or more desires, benefits, needs or advantages, or in achieving one or more objects of the invention; (b) its customization and tailoring to each particular user, preferably being moulded to the characteristic shape of their foot; (c) its custom fit to specific footwear; (d) its compliance and adherence to medically sound principles of design and use; (e) its coverage of the entire foot; and/or (f) its ability for transfer to other (similar structure) high heel footwear.

The EVA and Poron® materials, according to the invention, preferably afford significant comfort advantages for the user's foot and substantially/readily conform to the shape of the user's shoe pitch and slope line, with an ability to accommodate minor nuances.

The 3D scans, according to the invention, are preferably highly accurate.

The invention is contemplated for use by or in association with insoles, soles, and footwear. The invention, however, is not so limited. Other embodiments, which fall within the scope of the invention, may be provided. For example, the invention encompasses full 3D prints of high heel footwear (or any portions thereof) complete with one or more of the aforementioned features of the invention.

Preferably, devices, apps, systems, methods, and/or computer readable media according to the invention may be used for, and afford advantageous utilities with, industries and/or user environments other than those associated with insoles, soles, and/or footwear.

The foregoing description has been presented for the purpose of illustration and is not intended to be exhaustive or to limit the invention to the precise form disclosed.

Naturally, in view of the teachings and disclosures herein, persons having ordinary skill in the art may appreciate that alternate designs and/or embodiments of the invention may be possible (e.g., with substitution of one or more components for others, with alternate configurations of components, etc). Although some of the components, relations, configurations and/or steps according to the invention are not specifically referenced in the accompanying drawings or in association with one another, they may be used, and/or adapted for use, in association therewith. For example, features may be depicted or discussed herein in the context of the device, which clearly could be recast as the steps of a method, the inter-workings of a system, and/or recorded on computer readable media. (And, vice-versa.) All of the depicted and aforementioned and various other features, steps, inter-workings, structures, configurations, relationships, utilities, and/or the like (any of which may be depicted and/or based hereon) may be, but are not necessarily, incorporated into and/or achieved by the invention. Any one or more of the depicted and aforementioned features, steps, inter-workings, structures, configurations, relationships, utilities and the like may be implemented in and/or by the invention, on their own, and/or without reference, regard or likewise implementation of any of the other depicted or aforementioned features, steps, inter-workings, structures, configurations, relationships, utilities and the like, in various permutations and combinations, as will be readily apparent to those skilled in the art, without departing from the pith, marrow, and spirit of the disclosed invention.

Other modifications and alterations may be used in the design, manufacture, and/or implementation of other embodiments according to the present invention without departing from the spirit and scope of the invention, which is limited only by the claims of this patent application.

The invention claimed is:

1. A custom orthotic sole device customized to a foot of a user and a high heeled footwear of the user, wherein the custom orthotic sole device is manufactured using a three-dimensional ("3D") foot scan of characteristic anatomical features of the user's feet and a 3D footwear scan of the high heeled footwear, the 3D footwear scan including a slope line of the footwear and a pitch of the high heeled footwear to provide custom fit of the orthotic sole device to the footwear;

wherein the device is shaped, in dependent relation based on the three-dimensional ("3D") foot scan, to correspond to the characteristic anatomical features of the user's feet; and wherein the custom orthotic sole device is further shaped to define one or more orthotic sole features selected from:

a sunken heel cup portion, wherein the sunken heel cup portion is a sunken area on the heel portion of the insole shaped to counter-shift a weight of the user backwards and to help realign a heel of the user;

a heel stopper portion adjacent to and forward of the heel cup portion, wherein the heel stopper portion is a protruding crescent shaped to engage and support a calcaneus of the user and stop the calcaneus from sliding downward in the high heeled footwear;

an arch portion, wherein the arch portion is located to raise and fully support the arch of the user's foot and is raised to a predetermined degree to stabilize a posture of the foot of the user in the high heeled footwear and reinforce and stop the foot of the user from sliding downward in the high heeled footwear;

a metatarsal head pad portion built-up to a predetermined height to lift the bones of the user's foot and to splay the user's toes, the metatarsal head pad portion having a predetermined durometer and hardness value, wherein the metatarsal head pad portion is shaped to support the weight of the user, to achieve any predetermined shift of metatarsal heads of the user's feet, and to help achieve any predetermined splay of toes of the user's feet;

a bunion cut out shape located adjacent the user's first metatarsal-phalangeal joint, wherein the bunion cut-out portion is shaped to offload a bunion area of the user, and to reduce pressure on a forefoot of the user; and a built-in toe crest portion located to be gripped by the user's toes, wherein the toe crest portion is shaped to space and divide the toes of the user, to keep the toes inside the high heeled footwear, and to prevent the toes from becoming squished, overlapping, or falling out from the high heeled footwear.

2. The custom orthotic sole device of claim 1, wherein the custom orthotic sole device is shaped in dependent relation based on the 3D footwear scan; and wherein the characteristic anatomical features of the foot of the user are matched with the slope line and the pitch of the high heeled footwear.

3. The custom orthotic sole device of claim 1, wherein a combination of the one or more orthotic sole features is adapted to help provide for redistribution of the weight of the user away from the forefoot of the user.

4. The custom orthotic sole device of claim 3, wherein the custom orthotic sole is further adapted to help avoid toe crush and/or toe spilling of the toes of the user at a toe box area of the footwear.

5. The custom orthotic sole device of claim 4, wherein the custom orthotic sole is infused with a blend of *eucalyptus* oils and/or silver ions, to lend substantial antifungal, antibacterial, and/or moisture wicking characteristics.

* * * * *